(12) United States Patent
Reade et al.

(10) Patent No.: US 7,490,054 B2
(45) Date of Patent: Feb. 10, 2009

(54) RFID SYSTEM AND METHOD FOR VENDING MACHINE CONTROL

(75) Inventors: Walter C. Reade, Appleton, WI (US); Jeff Lindsay, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1174 days.

(21) Appl. No.: 10/301,879

(22) Filed: Nov. 21, 2002

(65) Prior Publication Data
US 2004/0103033 A1  May 27, 2004

(51) Int. Cl.
*G06Q 20/00* (2006.01)
(52) U.S. Cl. ........................................... 705/16
(58) Field of Classification Search ............... 705/16, 705/22, 28, 26
See application file for complete search history.

(56) References Cited

U.S. PATENT DOCUMENTS

| | | | |
|---|---|---|---|
| 4,656,463 A | 4/1987 | Anders et al. | |
| 5,047,614 A | 9/1991 | Bianco | |
| 5,164,707 A | 11/1992 | Rasmussen et al. | |
| 5,361,070 A | 11/1994 | McEwan | |
| 5,380,991 A | 1/1995 | Valencia et al. | |
| 5,677,927 A | 10/1997 | Fullerton et al. | |
| 5,687,169 A | 11/1997 | Fullerton | |
| 5,711,160 A | 1/1998 | Namisniak et al. | |
| 5,727,153 A | 3/1998 | Powell | |
| 5,798,694 A | 8/1998 | Reber et al. | |
| 5,832,035 A | 11/1998 | Fullerton | |
| 5,918,211 A | 6/1999 | Sloane | |
| 5,942,977 A | 8/1999 | Palmer et al. | |
| 5,955,969 A | 9/1999 | D'Hont | |
| 5,990,794 A | 11/1999 | Alicot et al. | |
| 6,037,879 A | 3/2000 | Tuttle | |
| 6,177,903 B1 | 1/2001 | Fullerton et al. | |
| 6,195,006 B1 | 2/2001 | Bowers et al. | |
| 6,218,979 B1 | 4/2001 | Barnes et al. | |
| 6,226,619 B1 | 5/2001 | Halperin et al. | |
| 6,249,227 B1 | 6/2001 | Brady et al. | |
| 6,294,997 B1 | 9/2001 | Paratore et al. | |
| 6,354,493 B1 | 3/2002 | Mon | |
| 6,386,450 B1 | 5/2002 | Ogasawara | |

(Continued)

FOREIGN PATENT DOCUMENTS

DE   29714999   11/1997

(Continued)

OTHER PUBLICATIONS

Advertisement—WWW.MOBILECLOAK.COM—mCloak—RFID Tolltags Etc., Copyrighted—2002.

(Continued)

*Primary Examiner*—Ronald Laneau
(74) *Attorney, Agent, or Firm*—Dority & Manning, P.A.

(57) ABSTRACT

A RFID method and system are provided to aid consumers in making an informed decision prior to purchasing products from a vending or other type of dispensing machine. The products in the machine are associated with a smart tag that contains information regarding the product that may be of interest to a consumer prior to purchasing the product. A smart tag scanner is incorporated with the dispensing machine and used to retrieve the product information from the smart tags.

25 Claims, 2 Drawing Sheets

U.S. PATENT DOCUMENTS

| | | |
|---|---|---|
| 6,407,665 B2 | 6/2002 | Maloney |
| 6,409,086 B1 | 6/2002 | Pellaumail et al. |
| 6,429,768 B1 | 8/2002 | Flick |
| 6,435,407 B1 | 8/2002 | Fiodelisi |
| 6,446,049 B1 | 9/2002 | Janning et al. |
| 6,451,154 B1 | 9/2002 | Grabau et al. |
| 6,491,217 B2 | 12/2002 | Catan |
| 6,497,656 B1 | 12/2002 | Evans et al. |
| 6,507,279 B2 | 1/2003 | Loof |
| 6,587,835 B1 | 7/2003 | Treyz et al. |
| 6,640,214 B1 | 10/2003 | Nambudiri et al. |
| 6,693,511 B1 | 2/2004 | Seal |
| 6,693,539 B2 | 2/2004 | Bowers et al. |
| 6,694,177 B2 | 2/2004 | Eggers et al. |
| 6,707,376 B1 | 3/2004 | Patterson et al. |
| 6,707,381 B1 | 3/2004 | Maloney |
| 2002/0040321 A1 | 4/2002 | Nicholson |
| 2002/0070862 A1 | 6/2002 | Francis et al. |
| 2003/0006281 A1* | 1/2003 | Thomas et al. .............. 235/385 |
| 2003/0030539 A1* | 2/2003 | McGarry et al. ............. 340/5.9 |
| 2005/0143857 A1* | 6/2005 | Chirnomas .................. 700/244 |
| 2005/0167493 A1* | 8/2005 | Barton et al. ................ 235/383 |
| 2006/0122881 A1* | 6/2006 | Walker et al. ................. 705/14 |

FOREIGN PATENT DOCUMENTS

| | | |
|---|---|---|
| DE | 19742126 | 3/1999 |
| WO | 0169429 A2 | 9/2001 |
| WO | 0215073 | 2/2002 |
| WO | 0215073 A1 | 2/2002 |
| WO | 0248955 A1 | 6/2002 |
| WO | 02080060 | 10/2002 |
| WO | 02080060 A1 | 10/2002 |
| WO | 00065532 A1 | 11/2002 |

OTHER PUBLICATIONS

Advertisement—WWW.MOBILECLOAK.COM—RFID Tags, Copyrighted—2002.
Ultra-Wideband Technology for Short-or Medium-Range Wireless Communications, Copyrighted—2001 Intel Corporation.
Ultra Wideband: The Ultimate Disruptive Technology, WWW.ULTRAWIDEBANDPLANET.COM—Jun. 11, 2001—INT Media Group.
U.S. Approves Ultra-Wideband Technology, WWW.WIRELESSNEWSFACTOR.COM—Feb. 15, 2002.
New Public Safety Applications and Broadband Internet Access Among Uses Envisioned by FCC Authorization of Ultra-Wideband Technology, Federal Communications Commission Feb. 14, 2002.
Ultra Wideband—SEARCHNETWORKING.COM, Copyrighted 2000-2002—Techtarget.
Internet Article—WWW.TIMEDOMAIN.COM—PulsON Technology Capabilities, Sep. 3, 2003.
White Paper—Integration of Auto-ID Tagging System With Holonic Manufacturing Systems—Cambridge University Auto-ID Center, Published—Sep. 1, 2001.
Auburn University—Detection & Food Safety Center—AUDFS.ENG.AUBURN.EDU, Sep. 4, 2002.
Internet Article—Smart Tags Indicate Freshness—COURSES.CHE.UMN.EDU, Sep. 4, 2002.
Internet Article—WWW.AIMGLOBAL.ORG—Pharmaceutical Distributor Cuts Day of Safety Stock, Aug. 29, 2002.
Internet Article WWW.IDTECHEX.COM—Independent Market, Strategic and Technology Reports, Aug. 29, 2002.
Internet Article—WWW.READYMEALSINFO.COM—M&S Pilots RFID System for Fresh Food Operation, Sep. 4, 2002.
Internet Article—AUDFS.ENG.AUBURN.EDU—Auburn University Detection & Food Safety Center, Sep. 4, 2002.
RFID Journal—Internet Article—WWW.RFIDJOURNAL.COM—Auto-ID Center Opens Demonstration Lab in the U.K., Sep. 4, 2002.
Internet Article—WWW.AUTOIDCENTER.ORG—Transmitting ePC Codes, Aug. 26, 2002.
Internet Article—WWW.ELECTRONICIDINC.COM—Destron-Fearing Electronic ID Background, Sep. 4, 2002.
Internet Article—DESTRONFEARING.COM—Applicatioins-Companion Animals, Sep. 4, 2002.
Internet Article—AUDFS.ENG.AUBURN.EDU—Auburn University—Detection & Food Safety Center, Sep. 4, 2002.
Internet Article—SFGATE.COM—Shops Try Chips for Tracking Every Move by Client 'Tribe' Monitoring Systems Note What Catches Customers' Eyes, Aug. 6, 2002.
Internet Article—WWW.AIMGLOBAL.ORG—Radio Frequency Identification—RFID a Basic Primer, Sep. 28, 1999.
Internet Article—WWW.AIMGLOBAL.ORG—Common Applications—RFID, Jul. 23, 2002.
Internet Article—WWW.USATODAY.COM—New Chips Could Make Everyday Items 'Talk', Jul. 23, 2002.
Forbes Magazine—The Internt of Things, Mar. 18, 2002.
Auto-ID Center—Institute for Manufacturing, University of Cambridge—White Paper—Auto-ID Based Control—An Overview, Feb. 1, 2002.
Wireless Handhelds—Beam Up Some Information, Scotty, Control Engineering, May 2002.
Scientific American—Wireless Data Blaster, May 2002.
Auto-ID Center, Institute for Manufacturing, University of Cambridge, White Paper—The Intelligent Product Driven Supply Chain, Feb. 1, 2002.
Auto-ID Center Massachusetts Institute of Technology—White Paper—Smart Medicine—The Application of Auto-ID Technology to Healthcare, Feb. 1, 2002.
U.S. Appl. No. 10/301,513, filed Nov. 21, 2002.
U.S. Appl. No. 10/301,882, filed Nov. 21, 2002.
U.S. Appl. No. 10/301,877, filed Nov. 21, 2002.
U.S. Appl. No. 10/301,846, filed Nov. 21, 2002.
U.S. Appl. No. 10/301,883, filed Nov. 21, 2002.
U.S. Appl. No. 10/301,549, filed Nov. 21, 2002.
"Theory, History, and the Advancement of Parametric Loudspeakers: A Technology Overview", by James J. Croft and Joseph O. Norris, Revision D, American Technology Corporation, San Diego, CA 2002. Available at http://www.atcsd.com/pdf/HSSWHTPAPER-RevE.pdf.
Popular Science, What's New, Suzanne Kantra Kirschner, We've heard hypersonic sound. It could change everything. Exemplary applications of hypersonic technology are illustrated at www.popsci.com/popsci/hometech/article/0.12543.351353.00.html.
D. McFarlane, "Auto-ID Based Control," White Paper for the Auto-ID Centre Institute for Manufacturing, University of Cambridge, Cambridge, United Kingdom, Feb. 1, 2002. Available at http//www.autoidcenter.org/research/CAM-AUTOID-WH-004.pdf.
Chien Yaw Wong, "Integration of Auto-ID Tagging System with Holonic Manufacturing Systems," White Paper for the Auto-ID Centre Institute for Manufacturing, University of Cambridge, Cambridge, United Kingdom, Sep. 2001. Available at www.autoidcenter.org/research/CAM-WH-001.pdf.
Wincor Nixdorf, Member of METRO Group, Future Store Initiative, "Store Vision—High-Tech for the Future in Retail," Wincor Vision May 2003. Available at http:/www.wincor-nixdor.com/internet/com/Idustries/Retail/WincorVision/WincorVisionSpezialFSI.templateld=blob.jsp.property=Data.pdf.
AMSKAN Editorials, RFID Overview: The science of evaluating RFID (Radio Frequency Identification) Technology, AMSKAN Update: Jan. 1999. Available at www.amskan.com/html/rfid_overview.html.
Ludwig Weimann and Junru Wu Transdermal Drug Delivery by Sono-Macroporation http://ultra-sonictechnologies.com/cancun-presentation.htm Nov. 4, 2003 11:28:14 AM.

* cited by examiner

RFID SYSTEM AND METHOD FOR VENDING MACHINE CONTROL

TECHNICAL FIELD OF THE INVENTION

The present invention relates generally to the field of article dispensing machines, and more particularly to a system and method for previewing articles in a dispensing machine prior to selecting or purchasing such articles.

BACKGROUND

Radio Frequency Identification Devices (RFIDs) are low-cost, passive "smart" chips or "tags" that can be embedded in or attached to articles, products, and the like to convey information about the product via a scanner. The smart tags are generally small label-like devices with a micro-chip and a miniature embedded antennae. The tags may be passive or active, the active tags requiring an internal power supply. A reader or scanner interrogates the smart tag with an electronic "trigger" signal. The tag in turn generates an electromagnetic pulse response that is readable by the scanner, the response containing the product information. RFID smart tags can be embedded in or attached to product packaging, or incorporated directly into the product, and may convey conventional "bar code" information, as well as other more detailed information.

Various commercial applications have been suggested for smart tags, particularly in the area of retail marketing and sales. For example, RFID technology may be used to gather information related to consumer trends, purchasing habits, consumption rates, etc. It has also been suggested that RFID technology has promise in the areas of inventory control, manufacturing process and control, product accountability and tracking systems, etc. Manufacturers, shippers, and retailers may be able to follow a given product through their respective systems from initial production through to point of sale. It has been suggested that other applications may include shopping carts that automatically charge a bank account, refrigerators that tap into the Internet to automatically reorder items that are running low, and interactive televisions linked to such refrigerators that will feed targeted commercials and special offers to consumers. (See, "They Know What You Eat," by Kayte VanScoy, Smart Business, January 2001).

The present invention relates to a novel implementation of RFID technology in the field of article dispensing machines, particularly vending machines.

The use of article dispensing machines, for example conventional vending machines, as a mechanism for storing and distributing any type of article or consumer good is widespread. Food product vending machines may be found in virtually any business establishment. The use of food product vending machines in schools, cafeterias, hospital canteens, work place break rooms, and so forth, is convenient for both consumers and distributors. Vending machines are also commonly used for the distribution of protective clothing items in hospitals and medical facilities, over-the-counter medications, beverages, etc.

A drawback with conventional dispensing machines is, however, the fact that the consumer is not given "hands-on" access to the articles until they have been paid for. In the case of food products, the consumer does not have the opportunity to preview the dietary or nutritional information contained on the product packaging unless the product is purchased and dispensed from the machine. This situation may be particularly problematic for individuals having food allergies. Such individuals must read the ingredients listed on the labels of food products to avoid ingredients that may cause potentially serious allergic reactions. This is generally not possible with conventional vending machines and the individuals must thus avoid purchasing unfamiliar products from vending machines.

Consumers also read food product labels for other reasons. For example, with the growing awareness and appreciation of the health risks associated with obesity and excess weight, dietary and nutritional considerations are an important concern for many individuals. Other individuals may wish to avoid meat products and by-products for religious, moral, or other reasons. Individuals with particular medical conditions or taking medications may need to avoid certain types of foods or certain medications or other products that can be dispensed by a dispensing machine. For example, individuals with hypertension may wish to avoid sodium. Such information is gleaned from the product packaging and, thus, is not readily available if purchasing the product from a vending machine.

The same issues apply to the distribution of medicines from vending machines. For many individuals it is very important to review the precautions and warnings provided on the packaging of medications, for example to determine if there are any conflicts with existing medical conditions or medications the individual is already taking. Consumers of non-food goods distributed from dispensing machines may wish to learn more about the article prior to purchase as well. For example, many individuals are extremely allergic to latex and may wish to determine if an article of clothing or protective gear they are about to purchase from a vending machine contains latex. With conventional vending machines, the consumer may be able to view the products through a transparent door or panel prior to selection, but is provided with little additional information about the products. This prevents many consumers from purchasing products from vending machines altogether, and is generally inconvenient for the consuming public as a whole.

The present invention provides a RFID system and methodology that may address drawbacks to the use of conventional vending machines.

SUMMARY

Objects and advantages of the invention will be set forth in the following description, or may be obvious from the description, or may be learned through practice of the invention.

A methodology and system according to the invention involves, in general aspects, the incorporation of a RFID smart tag system with any manner of dispensing machine used to remotely distribute goods to consumers. The type of dispensing or vending machine, and type of goods or articles dispensed, are not limitations on the invention.

The system includes the use of smart tags "associated" with the products stored in the dispensing machine or with the consumer or both. The smart tags contain or provide pointers (links) to any manner of information on the products in the machine and/or the consumer who wishes to use the machine. A smart tag scanner may be used for obtaining and conveying the product information so that a consumer may make an informed decision about a product prior to purchasing the product from the machine.

In one embodiment, the system comprises smart tags associated with the consumer. Consumer needs or preferences can be obtained automatically via scanning the smart tag associated with the consumer, which may contain the consumer information directly or provide a code for retrieving the information from a consumer database or other electronic means such that the smart tag indirectly provides the desired consumer information. The consumer information (e.g., a warning that the consumer is allergic to peanuts) is then used to screen products and enable an appropriate selection by the consumer. Screening of the products may be done based on product information obtained via smart tags associated with the products. Thus, an RFID scanner in the dispensing machine may scan a smart tag associated with the consumer, poll a database to obtain personalized data about the consumer, compare the personalized data with information associated with the ID codes of the products in the dispensing machine, and then make a recommendation for suitable products that can be dispensed, or take other actions such as preventing the vending of unsuitable products. The consumer's ID can also be used to determine an account for billing the consumer, such that coins or currency need not be used.

The smart tags may be provided with each individual product, for example adhered or otherwise attached to the product package, or a single smart tag may be assigned for each type or brand of product. For example, a vending machine may dispense six different types of soft drinks, and the machine may include six smart tags (one tag associated with each type of drink). As mentioned, the smart tags contain information relating to their respective product, including electronic product identification codes which can be used as pointers to detailed product information. Thus, the smart tags can directly provide information, or provide a pointer or link to detailed information in a database or other source, which can be retrieved as needed. Virtually any type of information is within the scope and spirit of the invention. For example, with food products, the smart tags may be pre-programmed with information such as ingredients, and nutritional and dietary information such as calories, fat grams, carbohydrates, etc. The information can also include a list of possible contaminants, MSDS data, manufacturing history, freshness date, packaging composition, place of manufacture, manufacturing company or parent company thereof, list of preservatives or artificial colors or flavorings, recycling categories (e.g., ability of a product to be recycled), amount of recycled material or post-consumer waste used in product packaging, presence of materials that may be choking hazard, etc. In general, the food product information may be any information which may be of particular concern to consumers with food allergies or dietary and nutritional concerns, or taking certain medications or having other health indications. In this way, consumers with special food allergy, dietary, medical, or nutritional concerns may make informed decisions prior to purchasing or consuming the food products.

The smart tag scanner may be configured with the vending machine in a number of ways. In one embodiment, the scanner is an integral component of the machine and may be, for example, integrated with the machine's selection mechanism. The machine may have a pre-selection mode wherein a consumer "pre-selects" a product of interest through a keypad or other selection device. Alternatively, a pre-selection may be made based on information provided in a readable smart card or accessible from a database using a personal RFID code pertaining to the consumer and read by an RFID scanner. (e.g., personal information read from a consumer database for an automatically identified consumer may indicate that the consumer is allergic to peanuts, in which case the pre-selection may comprise one or more products that are certified to be free of peanuts. Alternatively, the personal information may indicate that the consumer does not wish to purchase products from certain countries with human rights problems, in which case products made in the list of unapproved countries would be excluded in the pre-selection. Specific manufacturers may also be excluded, for example.) Consumer purchase history may also be used to automatically recommend one ore more products that are likely to be desired by the consumer.

Pre-selection results in a signal intelligible to the consumer (e.g., a visible or audible display) indicating that one or more products have been pre-selected for vending, and may also cause detailed information about the one or more pre-selected products to be made readily available to the consumer to enable an informed purchasing decision to be made. A purchase decision can then be made and the item purchased.

The information provided to the consumer about pre-selected products may be obtained in any of several ways and provided by visual, audible, or other means. For example, information about each product may have been previously entered into machine-readable memory, either by direct downloading or entry of data, or by reading a product ID code (either an RFID code from a smart tag, a bar code or two-dimensional data matrix code from a printed label, and the like). The machine-readable memory may be physically integrated with the dispensing device, or may be in a remote location such as a product database on a server that may be queried by a processor in the dispensing device, using an RFID code or other electronic code such as a URL (Universal Resource Locator) as a pointer.

In one embodiment, product information for pre-selected products is obtained from a database via the RFID product code read by a smart tag scanner associated with the vending machine, and this may be done after the preselection is made, or the information can have been previously obtained and then simply retrieved when the pre-selection is made. To obtain product information via RFID means, a smart tag scanner transmits an excitation "trigger" signal. The excitation signal is received by the smart tags and causes the tags to generate a signal that is received by the scanner. The scanner processes the signal and may directly cause the product information contained in the signal to be displayed to the consumer, if the smart tags independently contain the needed information, otherwise an electronic product code emitted by a smart tag may be used to access associated information in machine-readable memory such as from a database, and the obtained information or a pertinent subset thereof may be provided to the consumer. Thus, product information may be obtained directly or indirectly via scanning of smart tags.

In one embodiment, the scanner may "excite" all of the smart tags in the machine and simply filter out or disregard all but the signal received from the selected product. In another embodiment, the scanner will emit a product-specific excitation signal that is tuned only for a particular smart tag, and which is ignored by the other smart tags. In another embodiment, the RFID code for each product is obtained separately, either by scanning a representative product for each group of identical items in the vending machine as the products are loaded, or by having a short-range scanner positioned near the article to be dispensed make a reading of the smart tag code in the article to be dispensed. A plurality of scanners may be used in such cases, or a single scanner may be adapted to move to multiple locations to provide the reading without interference from other products.

The vending machine may include a visual display screen configured with the scanner to display the retrieved information. In another embodiment, the machine may be equipped with synthesized voice capability wherein the product information is relayed in a voice message to the consumer. In one embodiment, narrow beams of sound are projected to the consumer such that others do not hear the message. Hypersonics sound technology, such as that provided by American Technology (San Diego, Calif.), employs narrow ultrasonic beams that can be projected to a single user, wherein nonlinear effects can create audible sound when a human ear is in the beam path. Principles of hypersonic sound systems are described in a white paper entitled, "Theory, History, and the Advancement of Parametric Loudspeakers: A Technology Overview," by James J. Croft and Joseph O. Norris, Revision D, American Technology Corporation, San Diego, Calif., 2002, available at http://www.atcsd.com/pdf/HSSWHTPA-PERRevD.pdf. Exemplary applications of hypersonic technology are illustrated at www.popsci.com/popsci/hometech/article/0,12543,351353,00.html.

It is also within the scope and spirit of the invention to retrofit existing vending or other dispensing machines with the RFID system according to the invention.

In an alternative configuration, the smart tag code may also include a link to a remote database that contains additional information about the product. For example, the code may contain a URL link to an Internet website or other database. In this embodiment, the scanner may be configured with an internet browser that uses the URL to access the website or database. The website or database may be maintained, for example, by the manufacturer of the product, and provide any manner of additional information about a selected product. In this embodiment, the scanner may be Internet accessible, or linked with an Internet accessible system or linked directly to a database or Intranet. A display screen may be provided to display the web site or database information, and the system may be interactive such that the consumer can navigate the web site or select information displayed from a database. The web site or other interactive means may allow the consumer to enter personal information in order to recommend a suitable product. For example, a vending machine that dispenses bottles containing lotion or shampoo may query the user for information pertaining to skin or hair care needs (or access such information from a consumer database after identifying the customer using RFID technology or other means), and then make a selection from a plurality of products based on accessible product information to recommend a suitable product or mixture of products to the consumer.

The invention also includes associated methods for providing consumers with product information on products dispensed from a vending or dispensing machine prior to the consumer purchasing such a product. (Such information may also be obtained after a product has been purchased.)

Additional aspects of the present methodology and system will be described below with reference to the figures.

DETAILED DESCRIPTION

Reference will now be made in detail to one or more embodiments of the invention, examples of which are graphically illustrated in the drawings. Each example and embodiment are provided by way of explanation of the invention, and not meant as a limitation of the invention. For example, features illustrated or described as part of one embodiment may be utilized with another embodiment to yield still a further embodiment. It is intended that the present invention include these and other modifications and variations.

Figure 1:
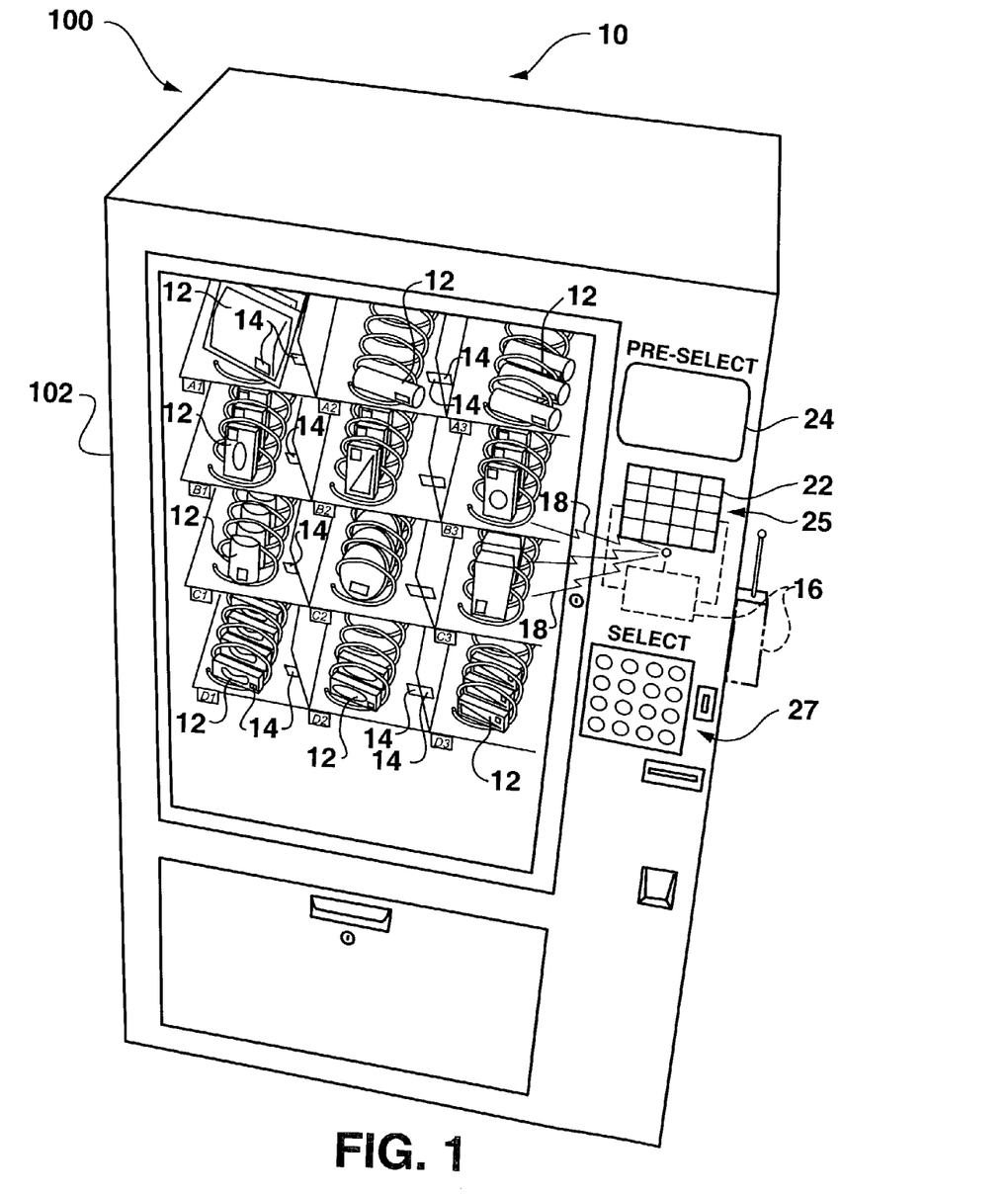
FIG. 1 is a graphic illustration of an article dispensing machine configured in accordance with principles of the present invention.

FIG. 1 graphically illustrates conceptual aspects of a dispensing machine method and system 10 according to the invention. A dispensing machine 100 is generically represented in the figure. It should be appreciated that the invention encompasses any type of dispensing or vending machine that may be used to remotely distribute goods to consumers. The terms "dispensing machine" and "vending machine" are used interchangeably to denote any type of machine that stores products for remote distribution or sale to consumers wherein the consumer essentially transacts business with the machine. After acceptance of payment (or after billing information has been obtained or verified), the dispensing machine expels or releases the selected product to the consumer. The operation of dispensing machines is well understood, and a detailed explanation thereof is not necessary for an understanding of the present invention. The goods may be for example, food products, beverages, medications, articles, cosmetics, toiletries, electronic devices, telephone cards, jewelry, and so forth. The type of goods distributed is not a limitation of the invention. For purposes of illustration only, the dispensing machine 100 is of the type commonly used to dispense food products such as snacks, candy, sandwiches, and the like.

Any variation of products 12 are stored at distinct locations within a machine cabinet 102 of the dispensing machine 100. Typically, the same type or brand of products 12 are assigned to a common storage location, such as location "A1." A different product 12 may be stored in location "A2," and so forth. At least one smart tag 14 is provided within the cabinet 102 and associated with each type of product. For example, the products 12 within storage location A1 are associated with a smart tag 14 containing product information on the respective products in location A1. Likewise, the products 12 in location A2, C1, D2, and so forth, are associated with smart tags 14 containing product information particular to the products in the respective locations.

In one embodiment, the smart tags 14 may be attached directly to each product 12. For example, the tags 14 may be adhered or otherwise attached directly to the package or wrapping of the product 12. With this embodiment, the order or location of the products 12 within the various storage locations is not particularly important. In another embodiment, a smart tag 14 is assigned to each storage location and contains the product information (or pointers to the product information) on the products put into the location. It is not necessary that the smart tag 14 be physically located in or even adjacent to the storage location. For example, all of the smart tags 14 may be contained in a common "bank" or location within the cabinet 102 Thus, this embodiment requires far fewer smart tags 14, but it should be ensured that the proper products are restocked in the proper locations within the cabinet 102.

It should be apparent that various options exist for restocking the machine 100 with products 12. As mentioned, the products 12 may be individually labeled or attached with a smart tag 14. In this case, the products 12 may be stored in any of the locations A1, A2, . . . Alternatively, a smart tag 14 is located within the machine cabinet 102 for each storage location and may be permanently programmed with "core" information for only one particular product. In this case, it must be ensured that the right products are restocked in the cabinet 102. In another restocking system, product-specific smart tags are provided with the bulk packaging of the products. Upon loading the products 12 into a particular location, the respective smart tag is placed within the machine cabinet 102, for example at the storage location of the products 12. With this system, the types or brands of products dispensed form any one machine may be easily varied.

As discussed in greater detail below, the tags 14 transmit coded product information 20 in response to an electronic "trigger" signal 18 from a scanner 16. The type or content of the product information may vary widely. For example, if the products 12 are food products, the product information in the smart tag code or accessible from a database via the smart tag code may include, for example, information about all ingredients contained in the food product, the nature and quantity of any preservatives and artificial colors, sodium levels, cholesterol content, sugar level, nutritional and dietary information, the presence of animal products or by-products, yeast content, genetically modified material content, kosher status, the presence of dairy goods, packaging or manufacturing date, freshness level (e.g., days left until food is no longer considered fresh), and so forth. For medicines, the product information may include any warnings or precautions concerning the use or consumption of the medicine, and so forth.

The vending machine 100 is configured with a smart tag scanner 16. In one embodiment, the scanner is an integral operating component of the machine and is built into the machine during the manufacture thereof. In another embodiment, the scanner may be retrofitted to existing dispensing machines. For example, the scanner 16 may be mounted to a side or top of the machine cabinet 102, as indicated by the dashed line scanner 16 in FIG. 1. Regardless of its location, the scanner 16 is configured to retrieve and decode the product information from the smart tags 14. With conventional RFID "smart" systems wherein the smart tags 14 are passive devices, the scanner 16 emits a "trigger" excitation signal 18 received by an internal antennae in the smart tag 14. This signal 18 causes the smart tag 14 to generate and transmit an electromagnetic pulse of digital data (the product information). For passive smart tags 14, the digital "data" is permanently programmed and constitutes the device's fixed code or "core" response signal 20. The same signal 20 is emitted each time by the smart tag 14. The coded signal 20 is received by the transmitter antennae 22, decoded, and the product information is presented to the consumer in various ways, as described in greater detail below.

RFID smart tag technology is known and understood by those skilled in the art, and a detailed explanation thereof is not necessary for purposes of describing the method and system according to the present invention. Generally, conductive or passive smart tags 14 consist of silicon or other semiconductors, a coiled, etched, or stamped antennae, a capacitor, and a substrate on which the components are mounted or embedded. A protective covering is typically used to encapsulate and seal the substrate. Inductive or passive smart tags have been introduced by Motorola under the name "BiStatix". A detailed description of the BiStatix device may be found in U.S. Pat. No. 6,259,367 B1, incorporated herein by reference in its entirety for all purposes. Another commercial source of suitable smart tags is Alien Technology Corporation of Morgan Hill, Calif., under the technology name FSA (Fluidic Self-Assembly). With the FSA process, tiny semiconductor devices are assembled into rolls of flexible plastic. The resulting "smart" substrate can be attached or embedded in a variety of surfaces. The smart tag technology under development at the Auto-ID Center at Massachusetts Institute of Technology (Cambridge, Mass.) can also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354,493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control," White Paper for the Auto-ID Centre Institute for Manufacturing, University of Cambridge, Cambridge, United Kingdom, Feb. 1, 2002, available at http://www.autoidcenter.org/research/CAM-AUTOID-WH-004.pdf; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001, available at www.autoidcenter.org/research/CAM-WH-001.pdf.

Other RFID technologies believed to be of value for the present invention include those produced by Microchip Technologies (Chandler, Ariz.), which provides remote read-write chips at several frequencies. Also of potential value are the I*CODE chips and readers of Philips Semiconductor (Eindhoven, The Netherlands), which, in one embodiment, are said to include 384 bit configurable read/write memory with 64 bits for a unique serial number (e.g., an electronic product code). Sokymat (Lausanne, Switzerland) markets the PICCOLO read-only RFID disc tag which transmits data to a reader station by an AM radio signal. The tag is said to have 64 bits of data that can be programmed during manufacturer by laser fusing of polysilicon links in order to store a unique code on each tag.

Texas Instruments (Dallas, Tex.) offers RFID technology as part of Texas Instruments RFID (TI*RFID™) Systems, formerly known as the TIRIS© system (Texas Instruments Registration and Identification System), which is used to track and identify various assets using devices such as the TI Tag It™ chip.

Gemplus (Gemenos, France) provides smart tags (sometimes called "smart labels") and smart cards employing RFID technology, which may be used as smart tags. They also market interfaces, antennas, scanners and software that can be adapted for use with smart tags.

Nedap (Groenlo, The Netherlands) provides smart cards and a 13.56 MHz smart tag using RFID technology with 512 bits of read-write memory with a range of about 120 cm. It is claimed that about 20 such tags per second can be read successfully by a scanner.

Checkpoint Systems Inc. (Miami, Fla.) offers a smart tag with WORM technology (write once, read many). One example is the MCRF355 chip, described more fully at http://www.idsystems.com/reader/1999_05/join0599.htm.

PDA-like reader systems and other portable readers for RFID technology are marketed by Omron Company (Tokyo, Japan), such as the Model V700 or V720 series.

High frequency bands can be used in RFID technology, such as bands between 300 MHz and 10 GHz. SCS Corporation (Rancho Bernardo, Calif.), for example, markets smart tag technology at 2.45 GHz. Ultra-wide band technology can also be adapted for RFID systems.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device. On a chip coupled with an antenna. The SAW device converts a radio signal to an acoustic wave, modulates it with an ID code, then transforms it to another radio signal that is emitted by the smart tag and read by a scanner. The ID code of the smart tag is extracted from the radio signal. The scanner is said to compare the spectral content of the signal with a database of signatures and to derive the ID code. This method enables a read range of up to 30 m (typical 10-20 m). The system can operate in the 915 MHz band and 2.45 GHz band. RFSAW, Inc. (Dallas, Tex.) also provides minute Surface Acoustic Wave (SAW) RFID devices that can be used within the scope of the present invention.

The antennae embedded within the smart tags 14 is generally one component of the device, though it is recognized that alternatives to antennas may exist in some applications. (For example, for some metallic objects, the smart tag need not comprise an antenna but the metallic object itself can serve as the antenna.) The excitation signal 18 from the scanner 16 must be received by the antennae to "activate" the smart tag. The received excitation signal 18 is the power source for the smart tag 14 and results in the generation of the electromagnetic pulse containing the coded product information signal 20. A detailed description of RFID smart tag antennas may be found in U.S. Pat. No. 6,320,556 B1, incorporated herein by reference for all purposes.

In an alternate embodiment, the smart tags 14 may be active devices. In this configuration, the smart tag 14 includes active transceiving circuitry that has the capability to selectively respond to coded request signals transmitted by a scanner 16. The active smart tag 14 may include the capability to delete its core data, and receive and store new or additional information beyond the information contained in its fixed code. An active smart tag 14 requires an internal power supply, such as a micro-battery, thin film battery, or the like. With the present invention, active smart tags may be desired in certain embodiments, for example where the dispensing machine contains individual smart tags for respective product storage locations and it is desired to vary the types or products dispensed. As a new type of product 12 is restocked, an associated active smart tag 14 may be reprogrammed with "new" product information for the new product.

A pre-selection mechanism 25 is configured with the dispensing machine 100 to enable a consumer to retrieve and view the product information of a product 12 within the machine prior to purchasing the product. The pre-selection mechanism is operatively tied to the scanner 16 such that upon selecting a product 12 for preview, the scanner 16 emits the trigger excitation signal 18 and receives and decodes the product information signal 20. The pre-selection mechanism 25 may be, for example, a touch activated device, such as the keypad 22 illustrated in the figure. The keypad 22 may contain a button for each storage location within the cabinet 102. For example, the buttons may be labeled "A1, A2, . . . " to correspond with the labeled storage locations within the cabinet 102. To preview a product 12 stored in location A1, a consumer pushes or activates the button A1, which in turn causes the scanner 16 to emit the excitation signal 18. In one embodiment, the signal may be a general signal that causes all of the smart tags 14 to respond. In this case, the scanner 16 is programmed to filter out or otherwise ignore the product information signals 20 from all but the selected product. For this purpose, each signal 20 may contain a prefix identification code that is recognized by the scanner 16. In another embodiment, the scanner emits an excitation signal 18 that is specific for only the smart tag 14 associated with the selected product. For example, the signal 18 may be modulated or coded for each different smart tag 14, and the smart tags 14 are "tuned" so as to only respond to that one particular excitation signal 18.

In an alternative embodiment, the pre-selection mechanism 25 is integrated with the machine's product selection device 27. In other words, a single device may serve for both pre-selection and final product selection. In this embodiment, The consumer may push or activate the appropriate button prior to some required act necessary for product purchase, such as insertion of money or a credit card into the machine, or a repeated number or sequence of button pushes.

The scanner 16 may be of conventional RFID hardware and software architecture. The scanner 16 receives the coded product information signal 20, and decodes the signal into usable commands and data. The scanner 16 includes a microprocessor and software programs for this purpose. The scanner 16 provides an output to the consumer that may be in various forms. For example, the scanner 16 may visually display the product information by way of a visual display screen 24. Alternatively, the scanner 16 may cause a voice message to be conveyed, or a printed message, and so forth.

In a more sophisticated embodiment, the dispensing machine 100 may be accessible to the Internet or a remote database by any conventional wired or wireless communication system. The product information signal 20 may include a link or code to the remote database for retrieval of additional product information. For example, the signal 20 may include a URL code to launch an Internet browser application. In this way, the scanner 16 may provide the consumer with Internet access to websites containing additional information about the selected product. In this embodiment, the scanner 16 may be an Internet accessible wireless device, such as a PDA (personal data assistant). The touch pad 22 or a separate keyboard may be provided with the scanner 16 for interactive communication via the Internet or remote database. The websites or databases may be maintained by, for example, the manufacturers, suppliers, or vendors of the food products.

It should be appreciated that the RFID smart tag/scanner system may be configured to accommodate consumers having visual impairment, language difficulties, illiteracy, etc. For example, the scanner 16 may contain a visual display 24 that conveys the food product information in different languages. The scanner 16 may emit voice messages in selected foreign languages. Various configurations of the scanner 16 in this regard are within the scope and spirit of the invention.

Figure 2:
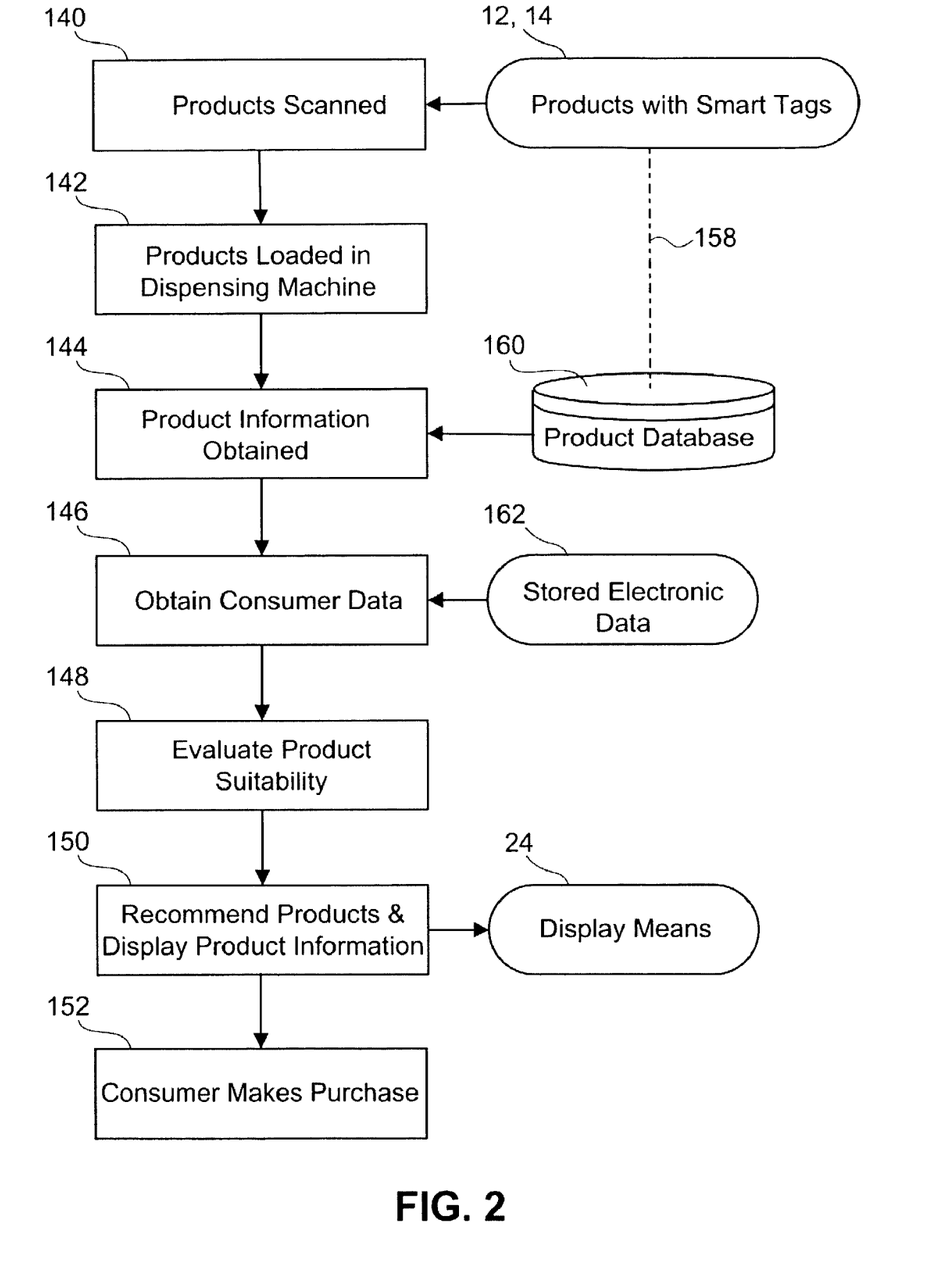
FIG. 2 is a block diagram illustrating process steps in accordance with an embodiment of the invention.

FIG. 2 is a schematic showing various steps in one embodiment of the system of the present invention. Products 12 with smart tags 14 are scanned 140 prior to or as they are loaded 142 into the dispensing machine. The scanned electronic product codes so obtained are used with a product database 160 to obtain product information 144. The relationship between the products 12 and the product database 160 is indicated with the dotted line 158. When a consumer approaches the dispensing machine, stored electronic data 162 pertaining to the consumer is obtained 146. This may occur by reading a smart tag associated with the consumer and then accessing a consumer database to obtain a profile of information for the consumer, and sorting for information pertinent to the products 12 of the dispensing machine, or by reading a card carried by the consumer (e.g., a magnetically encoded swipe ward or a smart card with a memory chip), or any other known electronic means, including querying the consumer for the consumer information with a computer-assisted questionnaire such as a form on a Web page. Once the consumer data is available, it may be compared to the product information by software processed by a processor associated with the dispensing machine (e.g., in cooperative association with the scanner) to determine what products are suitable. Then the dispensing machine may recommend suitable products and display product information 150 via display means 24, which may be auditory or visual. Products may be recommended by means of illumination (products or the associated selection buttons on the dispensing machine may light up, for example), or by physical motion of the recommended products (advancing in the dispensing machine or visibly moving up and down to catch the attention of the consumer, for example), or by display of text or spoken words to indicate suitable selections, or by preventing selection of unsuitable items, and any combination thereof. The consumer can then make a purchase 152 of one or more of the recommended products. In some cases, products that are not recommended may still be purchased, if desired, but in other cases, unsuitable products can be locked such that they cannot be purchased. For example, a child allergic to peanuts may be completely prevented from purchasing a peanut butter product, but someone whose consumer data indicates a preference for vegetarian products may have authority to override the recommendation in order to purchase beef jerky. The stored electronic data 162 pertaining to the consumer can indicate whether product recommendations in certain cases may or may not be ignored.

It should be appreciated by those skilled in the art that the system and method according to the invention have wide applications, and that the example and embodiments set forth herein are merely exemplary. It is intended that the present invention include such uses and embodiments as come within the scope and spirit of the appended claims.

What is claimed is:

1. A product dispensing machine configured with a RFID information system, comprising:
   a machine cabinet having storage locations for a plurality of products to be dispensed from said machine;
   at least one smart tag associated with each different type of product to be dispensed, said smart tags containing information related to their respective products;
   a smart tag scanner disposed within range of said smart tags;
   a pre-selection mechanism operatively configured with said scanner by which a consumer pre-selects a product contained within said cabinet, said scanner configured to retrieve said product information from said smart tag associated with the pre-selected product and cause said information to be conveyed such that a consumer may make an informed decision as to whether to purchase the product from said machine.

2. The dispensing machine as in claim 1, wherein the products contained therein comprise food products.

3. The dispensing machine as in claim 2, wherein said information contained by said smart tags comprises any combination of ingredients, dietary, and nutritional information.

4. The dispensing machine as in claim 1, wherein said smart tag scanner is disposed within said machine cabinet.

5. The dispensing machine as in claim 4, further comprising a display unit configured with said machine cabinet and in communication with said scanner, said display unit providing a visual indication of the product information to the consumer.

6. The dispensing machine as in claim 1, wherein said scanner is configured on an outside surface of said machine cabinet.

7. The dispensing machine as in claim 6, wherein said scanner comprises a visual display unit providing a visual indication of the product information to the consumer.

8. The dispensing machine as in claim 1, wherein said pre-selection mechanism is a touch-activated device.

9. The dispensing machine as in claim 8, wherein said touch-activated device is a keypad.

10. The dispensing machine as in claim 1, wherein said scanner emits a general excitation signal upon being activated by said pre-selection mechanism, said general excitation signal causing said smart tags associated with all products to generate a product information signal.

11. The dispensing machine as in claim 10, wherein said scanner filters out said product information signals from non-selected product smart tags.

12. The dispensing machine as in claim 1, wherein said scanner emits a product-specific excitation signal upon being activated by said pre-selection mechanism that is tuned for said smart tag associated with the selected product.

13. The dispensing machine as in claim 1, wherein said smart tags are attached to said products within said machine cabinet.

14. The dispensing machine as in claim 1, wherein a product-specific smart tag is associated with each type of product within said machine cabinet.

15. The dispensing machine as in claim 14, wherein said product-specific smart tags are disposed at product-specific storage locations within said machine cabinet.

16. The dispensing machine as in claim 1, wherein said information related to the respective products comprises information stored in a database accessible by the scanner.

17. The dispensing machine as in claim 1, wherein the products contained therein comprise absorbent articles.

18. A product dispensing machine configured with a RFID information system, comprising:
   a plurality of products stored within said machine;
   a smart tag associated with each said product, said smart tag containing information related to their respective products;
   a smart tag scanner; and
   wherein said scanner provides a consumer with said product information upon the consumer pre-selecting a product prior to purchase such that the consumer may make an informed decision as to whether to purchase the product from said machine.

19. A method for providing consumers with information related to products within a product dispensing machine, said method comprising:
   associating a smart tag with each type of product within the machine, the smart tags containing product information related to the respective products;
   configuring a smart tag scanner with the machine, wherein the scanner retrieves the product information from the smart tag associated with a product pre-selected by the consumer; and
   displaying the product information retrieved from the smart tag to the consumer prior to the consumer purchasing a product.

20. The method as in claim 19, wherein the products are food products and the product information is any combination of ingredients, dietary, and nutritional information related to the food products.

21. The method as in claim 19, comprising attaching a smart tag to each product within the machine.

22. The method as in claim 19, comprising restocking the machine with products having the smart tags attached thereto.

23. The method as in claim 19, comprising restocking the machine with products, and providing a respective product-specific smart tag within the machine for any new products stocked into the machine.

24. The method as in claim 19, comprising retrofitting dispensing machines with the smart tag scanner and smart tag associated products.

25. A product dispensing machine configured with a RFID information system for use by a consumer associated with a smart tag for conveying a personal information, comprising:

a plurality of products stored within said machine, each product associated with product information stored on a memory device;
product information associated with each said product;
a smart tag scanner adapted for reading information from the smart tag associated with the consumer; and
means for electronically obtaining information about consumer needs or preferences pertaining to at least one of said products by using the information read from the smart tag associated with the consumer;
wherein said scanner recommends to the consumer a selection of one or more products responsive to said information about consumer needs or preferences.

* * * * *